Patented Jan. 29, 1935

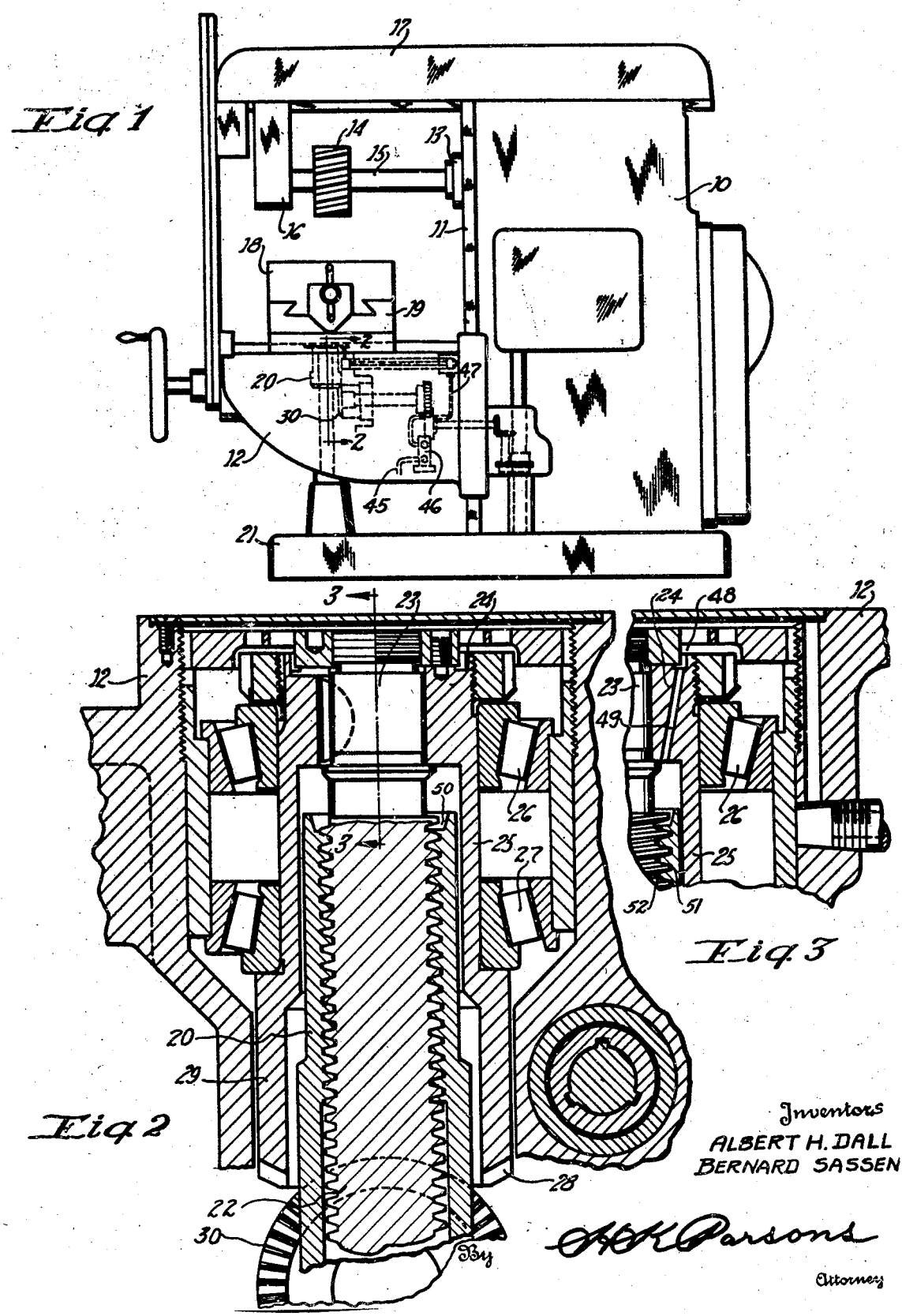

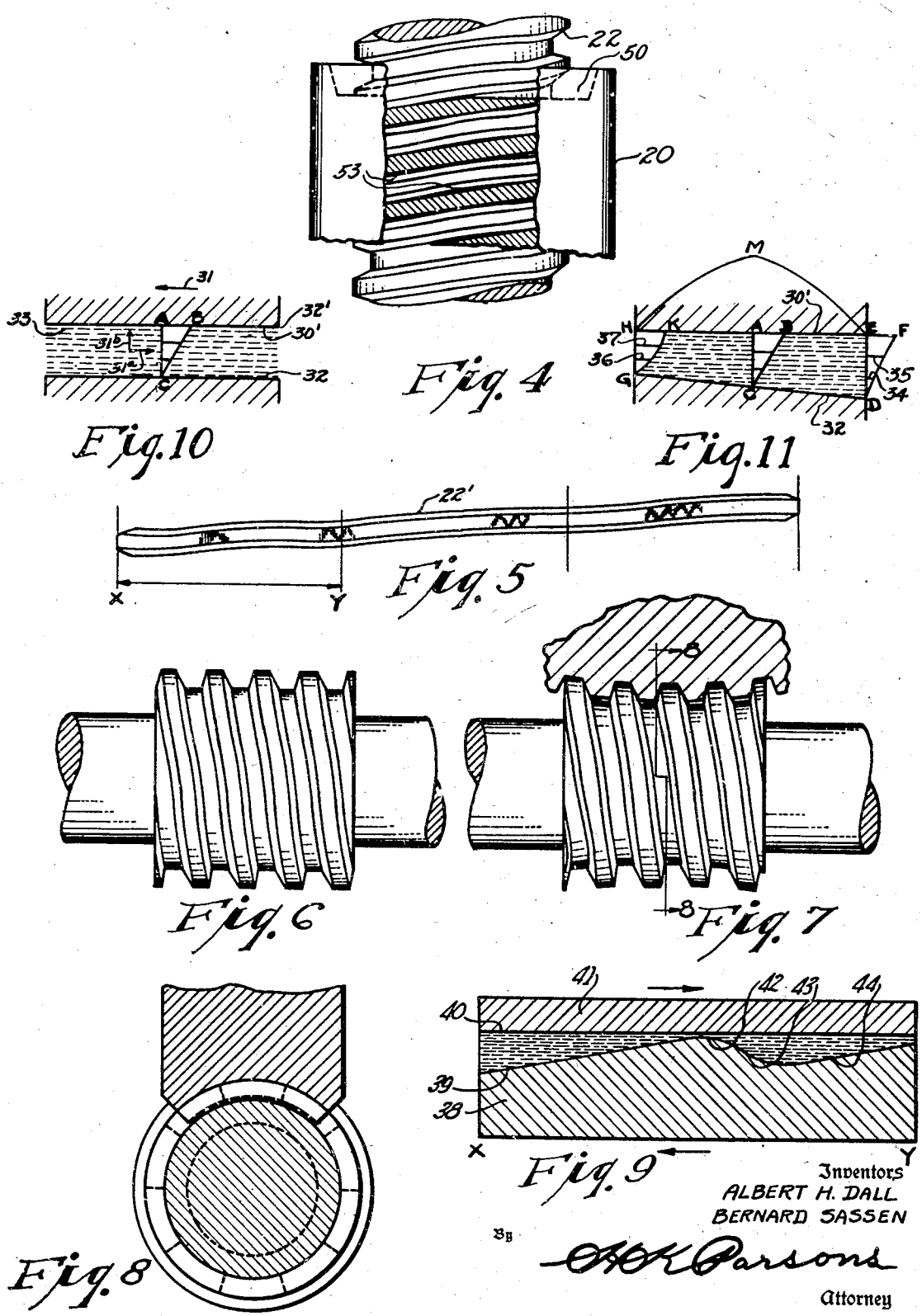

1,989,611

UNITED STATES PATENT OFFICE 1,989,611

WAVE SCREW

Albert H. Dall and Bernard Sassen, Cincinnati, Ohio, assignors to The Cincinnati Milling Machine Company, Cincinnati, Ohio, a corporation of Ohio Application April 5, 1933, Serial No. 664,580

11 Claims. (Cl. 74—424.8)

This invention relates to machine tools and more particularly to improved power transmitting mechanism therefor.

One of the common methods of transmitting motion from a power element to a driven element is by the use of intermeshing threaded members, and in this class may be included such devices as the screw and nut, worm and worm wheel, spiral gear pairs and the like. The capacity of this class of devices to operate under heavy loads however depends upon the application of proper lubrication thereto. Some of these devices are of such a nature that they inherently refuse lubrication due partly to their geometrical construction and sometimes to the relative position in which they are used. This is especially true of elevating screws used in machine tools to effect adjustment of a movable slide or other part of the machine. The movable slide or part may be directly connected to one of the co-acting members, while the other co-acting member is connected to a source of power whereby relative bodily movement between the coacting members will effect translation of the part in one direction or the other.

One of the objects of this invention, therefore, is to provide co-acting members of the class described which are so formed that they will sustain higher working pressures than is now possible with devices of the same type and size.

A more specific object of this invention is to provide an improved elevating mechanism for a vertically movable support of a machine tool.

Another object of this invention is to facilitate lubrication of elevating mechanisms for the movable member of a machine tool so that a high pressure-bearing lubricant film will automatically form between the coacting parts thereby eliminating metal to metal contact and making possible the sustention of heavy loads with a minimum of friction between the movable parts.

Other objects and advantages of the present invention should be readily apparent by reference to the following specification considered in conjunction with the accompanying drawings illustrative of one embodiment thereof, but it will be understood that any modifications may be made in the specific structural details thereof within the scope of the appended claims, without departing from or exceeding the spirit of the invention.

Referring to the drawings in which like reference numerals indicate like or similar parts:

Figure 1 is an elevation of a machine tool embodying the principles of this invention.

Figure 2 is a section on the line 2—2 of Figure 1.

Figure 3 is a detailed section on the line 3—3 of Figure 2.

Figure 4 is a view partly in section showing a screw of the improved form with its co-acting nut.

Figure 5 is an expanded view of one thread of the screw shown in Figure 4.

Figures 6 and 7 are views of other types of threaded members to which the principles of this invention may be applied.

Figure 8 is a section on the line 8—8 of Figure 7.

Figures 9, 10, and 11 are diagrammatic views illustrating the principles of operation of this invention.

This invention is particularly adaptable to elevating mechanisms for machine tools and therefore will be illustrated in connection with a milling machine, one type of which is shown in Figure 1. The reference numeral 10 indicates the column of such machine having guideways 11 formed on a vertical face thereof for guiding a vertically reciprocable support 12. Such machines are usually provided with a rotatable spindle 13 journaled in the upper part of the column for actuating a cutter 14 mounted on an arbor 15 which is operatively connected at one end to the spindle. The other end of the arbor may be journaled in a pendant 16 attached to the outer end of an over-arm 17, the overarm being adjustably mounted in guideways formed upon the top of the column.

The work is supported on a table 18 which may be power translated to cause stock removal by the cutter. The lateral position of the work with respect to the cutter and the depth of the cut is determined by a saddle 19 mounted for transverse movement on the knee 12, and by vertical movement of the knee upon the column.

It is customary practice to provide elevating mechanism for the knee in the form of screw and nut, one of which, such as the nut 20, may be fixed as with the pedestal 21 of the column, and the other, such as the screw 22, may be fixed with the knee for movement therewith.

In the present construction the upper end of the screw 22 has a reduced portion 23 upon which is keyed a gear member 24 having a shoulder 25 for receiving anti-friction bearings 26 and 27 by which the same are supported for rotation relative to the knee but fixed against axial movement relative thereto.

Relative rotation between the parts may be effected in any desirable manner and in the present instance is accomplished by providing gear teeth 28 on the lower end of the skirt 29 depending from the member 24. A suitable power actuated gear 30 may be meshed with the member 28 for effecting relative movement between the parts and thereby upward or downward movement of the knee.

It will be noted that the screw and nut are in a vertical position which makes it exceedingly difficult to apply proper lubrication thereto. It is well known that the capacity of intermeshing members of this type to withstand high unit pressures during the transmission of power depends in a large degree upon the application of proper lubrication to the contacting or load bearing surfaces. When adequate lubrication is applied, the power transmitting capacity of intermeshing members is then limited only by the structural strength of the parts, and they may then be so formed as to develop their full strength; but in structures of the nature disclosed where proper lubrication cannot be applied, it is necessary for the contact surfaces to be made larger per unit of power transmitted than would be the case with proper lubrication. It is thus obvious that the full structural strength of the parts cannot be developed and utilized and it is therefore necessary to make these parts larger than would be otherwise necessary.

Conventional practice dictates that the contacting surfaces of the class of devices under consideration be made parallel to one another even although these surfaces are winding or spiral in nature. Such parallel surfaces do not lend themselves to proper lubrication for two important reasons. The first is that the working part of the surface in the case of the screw is inclosed in the nut and because the nut is vertical and of considerable length difficulty is experienced in applying the necessary lubricant thereto. The other is that parallel surfaces utilized for load supporting purposes are inherently difficult to lubricate because a pressure bearing film will not form between them. This is due to the fact that the pressure between the surfaces is equal in all directions, and therefore there is a pressure existing at the feed or leading end of the moving part which prevents the admittance of lubricant. Furthermore, whatever lubricant may be present will be squeezed out by this uniform pressure in all directions in accordance with the well-known physical law and one part will settle on to the other and finally to a condition of metal to metal contact.

Since the geometrical shape of the surfaces is such that they inherently refuse lubrication, it is proposed by this invention to change the shape of such surfaces so that they will invite lubrication.

It is a well known hydro-dynamical theory that when two surfaces move relative to each other with a fluid between them, that a state of shear is set up in the fluid.

This is best understood by considering what may be termed herein as the laminar theory. Assuming that it is possible for two parallel surfaces to be maintained in definite spaced relationship with a body of lubricating fluid between them, such a fluid may be considered as composed of a number of layers or laminars lying parallel to the inclosing surfaces. If now, one of these surfaces such as 30', as shown in Figure 10, is moved at a given velocity in the direction of the arrow 31 relative to the surface 32, the following phenomena will take place. The layer of fluid which is in contact with the surface 30' will move with that surface and at substantially the same velocity. The layer of fluid which is in contact with the surface 32 will tend and practically will remain at rest with that surface. The result will be that the layer 33 which is moving at the velocity of the surface 30' will tend to impart motion to the intervening layers due to the friction existing therebetween which friction is known as viscosity.

If the co-efficient of viscosity is constant across the thickness of the fluid, each successive layer beginning from the surface 30' will be moved at a decreasing velocity. If a tangential force acts in the direction of the arrow 31 to move the surface 30', there will be a corresponding opposed force which would be the resultant of the summation of the frictional resistances existing between each layer opposing movement thereof. Although this frictional resultant force 31A acts in a direction opposite to the arrow 31, nevertheless, due to the fact that we are dealing with a body of fluid, there will be another resultant 31b normal to the surfaces 30' and 32, because any pressure existing in a fluid extends in all directions.

Assuming a copious supply of fluid at the inlet edges 32 and 32' and neglecting leakage transversely of the surfaces, the quantity of fluid, flowing between the surfaces per unit of transverse width, will be equal to the distance between the surfaces multiplied by the mean velocity of the various layers. This decrease in velocity across the layers may be graphically represented by a straight line because it is uniform. For instance, if the velocity of the surface 30' is represented by the line AB, and the line AC is used to represent the distance between the surfaces, the line CB may be utilized to represent the decrease in velocity of the various layers or in other words the velocity gradient. The area of the triangle ABC will therefore represent the quantity flowing between the surfaces for a given period of time. It will be noted from this figure that the quantity of flow is a constant and that the rate of change of velocity across the fluid is also a constant and therefore the pressure at any point throughout the length of the surfaces will be a constant.

As previously mentioned, however, this condition cannot be maintained with parallel surfaces due to the fact that the pressure, being equal in all directions, will eventually squeeze the fluid from between the surfaces and cause one to settle on to the other and eventually into metal to metal contact.

If, however, the surfaces are inclined to one another, that is, non-parallel, a different set of conditions arises which makes possible the formation of a pressure bearing film. Assuming that the surface 32 is now pivoted about the point C to the position shown in Figure 11, and that the same conditions exist at the cross section represented by the line AC as existed in the previous figure, that is, that the quantity of flow is represented by the area of the triangle ABC, it will be evident that this quantity must be the same at the inlet DE and also at the outlet GH because whatever quantity enters at DE must be discharged at GH. Since the quantity must be the same and since the velocity of the surface 30' is the same at all points, the area of the triangle DEF should be equal to the area of the triangle ABC but since the side EF is equal to the side AB, and the side DE greater than the side CA, the line connecting the points D and G must be concave in nature in order for the areas to remain equal. Similarly, the triangle GHK will have the side HK equal to AB, but the side GH will be less than line CA and therefore the line connecting G and K must be convex in nature in order to have the areas of the triangles equal. From this it will be seen that if the quantity of fluid flowing between the surfaces is constant, the mean velocity in the various cross sectional areas will have to increase in order to make this possible.

As previously mentioned in the case of the triangle ABC, the rate of change of velocity of the various layers increased from the surface 32 toward the surface 30' and this increase was at a uniform rate due to the fact that the line BC was a straight line. Considering now the line DF which is concave in nature, it will be noted that the increase in velocity along successive parallel lines such as 34, 35 increases at a non-uniform rate, in other words the "rate of increase" increases as the surface 30' is approached. Conversely, the change in velocity as measured along the lines 36 and 37 in the triangle GHK has a certain rate of increase, which rate decreases as the surface 30' is approached. It should now be apparent that there is a rate of change of velocity in the triangle DEF which "rate of change" increases across the film section; that there is a rate of change of velocity in the triangle CAB which is constant; and that there is a rate of change of velocity in triangle GHK which decreases across the film. If the laminar theory as previously explained is now followed, it will be seen that, in the triangle DEF, the shear stress which occurs between the successive layers will increase, due to the fact that the relative velocity between each successive layer increases and therefore it may be said that the rate of change of shear increases across the film. In the triangle CAB the rate of change of shear is constant due to the fact that the rate of change of velocity across the film is constant. In the triangle GHK the rate of change of shear decreases due to the fact that the rate of change of velocity decreases. As previously mentioned, there is a direct connection between the shear and the pressure between the surfaces and this pressure is dependent on the shear. Therefore, if there is an increase in the rate of shear from the line DE to the line CA through the wedge, there will be a corresponding increase in the pressure in a direction normal to the surfaces graphically represented by the curve EM, followed by a corresponding decrease in the pressure from the line CA to the line GH, represented graphically by curve MH, due to the fact that the rate of change of shear decreases from the line CA to the line GH and at the point CA the pressure will be constant and at a maximum. In this manner, it is possible to build up a load bearing pressure at an intermediate point in the length of opposed wedge surfaces which is dependent upon the fact that there is first an increasing rate of change of shear followed by a decreasing rate of change of shear. In other words, there must be a variable change in the "rate of change" in order to make the device effective.

It should now be apparent that parallel surfaces are of such a nature that they inherently oppose lubrication thereof while wedge-shaped surfaces are capable of building up a pressure bearing film therebetween. Use is made of this phenomenon by providing a threaded member, such as shown in Figure 4, on which the threads are so formed that in co-acting with the substantially straight surfaces of an inter-meshing threaded member 20, wedge surfaces will be formed which will build up a pressure bearing film therebetween. Since the tendency of a wedge film is to build up to a point of high pressure, it is desirable that in applying the same to structures such as shown in Figures 2 and 4 that these points of pressure be equally distributed around the circumference of the supported member. Although any number might be used, if, equally spaced, only three per thread have been illustrated see expanded view of thread 22' of screw 22, Figure 5. One section XY is shown enlarged in Figure 9 with its coacting surface from which it will be seen that one of the members, such as 38, is provided with a surface 39 which is at an angle to the corresponding surface 40 of the other member 41 thereby providing a wedge which terminates in a radius 42 and as here shown sharply declines at 43 so that formation of the next wedge surface 44 may immediately begin. Such a construction is preferable where a load is only to be carried during uni-directional rotation of the parts as it will be apparent that relative movement in the opposite direction, will nullify the effect of the wedge. If it is desirable, however, to provide a construction which is operative in either direction, an inclined surface such as 39 may be substituted for the surface 43 but extending of course in the opposite direction. This results in the limitation, however, that the number of peak pressure points per thread are less than is possible with the construction shown in Figure 9.

It should now be obvious that an elevating mechanism for a machine tool has been shown in which one of the coacting members has a waved thread intermeshing with a straight thread in the other member so that a plurality of wedge shaped films are formed in equally spaced relation around the periphery of the screw which produce a pressure bearing film adjacent the crest of each wave and the coacting straight surface of the nut which increases the load bearing capacity of the elevating mechanism. Since this construction invites lubrication, less power is required than heretofore to effect elevation of large loads. Furthermore, the improved lubrication makes higher elevating speeds possible without chattering or excessive vibration.

The lubricant may be supplied to the screw from a reservoir 45 in the base of the knee by means of a pump 46 and conduit 47, in a manner as more fully explained in copending application of L. F. Nenninger, Serial Number 467,695, filed July 14, 1930. The lubricant is delivered to the annular recess 48, Figure 3, in the top of member 24 from which it flows through channel 49 to the top of the nut 20 where it collects in the annular recess 50.

It will be noted from Figures 2 and 3 that a small space exists at 51 and 52 between the top of each thread and the coacting member and the oil travels downwardly in a spiral path through these spaces. Due to the waves in the screw thread, the oil will also find its way into the voids as at 53, Figure 4, created by the wave in the screw. These voids are always full and thus the wedge action will take place immediately upon movement of the screw.

The invention has other applications, such as to a straight worm as shown in Figure 6, or to what is known in the trade as the Hindley type of worm shown in Figure 7, or to the wheels coacting therewith.

What is claimed is:

1. In a machine tool embodying a first support and a second support guided thereon for movement in a definite path with respect thereto, means for effecting translation of the movable support in said path including a pair of relatively rotatable members having inter-meshing threads, one of said members being fixed with one of the supports, and the other being rotatably carried by the other of said supports, means to supply lubricant to the members at a point of interengagement of their threads, the thread of one of said members having a waved surface as respects the plane of the opposed thread of the other of said members, whereby wedge-like lubricant receiving recesses are provided for carrying the supplied lubricant between the operative interengaged thread surfaces and building up a pressure film reducing frictional resistance to movement of the impelled support.

2. A structure of the character described including a first support and a second support guided for movement with respect thereto, means for effecting relative movement of said parts including a screw and an elongated nut interengaged therewith, means for effecting rotation of one of said parts with respect to the other to produce relative axial movement, and means for reducing the friction incident to propulsion of the support by said relative rotation comprising depressions formed in the mating surface of the threads of one of said members providing a multiplicity of tapered oil receiving recesses within the telescoped portion of the screw and elongated nut insuring continuous adequate lubrication of the pressure opposing surfaces of said parts.

3. A structure of the character described including a first support and a second support guided for movement with respect thereto, means for effecting relative movement of said parts including a screw and an elongated nut inter-engaged therewith, means for effecting rotation of one of said parts with respect to the other to produce relative axial movement, means for reducing the friction incident to propulsion of the support by said relative rotation comprising depressions formed in the mating surface of the threads of one of said members providing a multiplicity of tapered oil receiving recesses within the telescoped portion of the screw and elongated nut insuring continuous adequate lubrication of the pressure opposing surfaces of said parts, power means for effecting the relative rotation of the parts, a lubricant reservoir, and means actuated by said power means for conveying lubricant from the reservoir to the oil receiving pockets of the threaded member to maintain adequate supply of lubricant therein.

4. A mechanism of the character described including a first support and a second support movable with respect thereto, an elongated nut carried by one of said supports and a screw cooperating with the nut and carried by the other of said supports, means for effecting relative rotation of the screw and nut to effect movement of the supports one with respect to the other, and means for maintaining a pressure oil film between the mating portions of the screw and nut including a waved mating surface on one of said threaded members, and an opposed plane surface on the other of said members whereby multiple wedge-like lubricant receiving pockets are provided intermediate said opposed mating surfaces producing an effective internal pressure oil film between the surfaces during relative rotation thereof for support movement.

5. A mechanism of the character described including a first support and a second support movable with respect thereto, an elongated nut carried by one of said supports and a screw cooperating with the nut and carried by the other of said supports, means for effecting relative rotation of the screw and nut to effect movement of the supports one with respect to the other, means for maintaining a pressure oil film between the mating portions of the screw and nut including a waved mating surface on one of said threaded members, and an opposed plane surface on the other of said members whereby multiple wedge-like lubricant receiving pockets are provided intermediate said opposed mating surfaces producing an effective internal pressure oil film between the surfaces during relative rotation thereof for support movement, means providing a lubricant reservoir circumscribing the screw whereby on relative rotation of the screw and nut the lubricant from the reservoir will be drawn between said mating surfaces, and means for effecting a constant supply of lubricant to the reservoir during relative rotation of said parts.

6. In a machine tool having relatively movable supports and telescopic nut and screw members for movement of said supports, said screw having a spiral thread provided on its power effective face with an undulating surface interengaging with a plane spiral surface on the nut whereby a multiplicity of tapered recesses are provided between the mating effecting surfaces of the screw and nut providing high pressure bearing areas creating a supporting film between the parts, whereby to avoid squeezing out of lubricant and metal to metal contact of the opposed faces of the threads of said screw and nut.

7. In a machine tool having relatively movable supports and telescopic nut and screw members for movement of said supports, said screw having a spiral thread provided on its power effective face with an undulating surface interengaging with a plane spiral surface on the nut whereby a multiplicity of tapered recesses are provided between the mating effecting surfaces of the screw and nut providing high pressure bearing areas creating a supporting film between the parts, means maintaining a constant supply of lubricant to said recesses whereby to avoid squeezing out of lubricant and metal to metal contact of the opposed faces of the threads of said screw and nut.

8. A machine tool or the like including a fixed support and a second support guided thereon for vertical movement with respect thereto, power means for elevating one support with respect to the other including telescoping screw and nut members, and means for minimizing the power requirements for elevation of the movable support comprising undulations establishing high and low points on the mating surfaces of the screw and nut members which support the load, and means for maintaining a continuous supply of lubricant to the recesses thus provided between the mating surfaces whereby on relative rotation of the parts, a pressure oil film will be built up wedging the surfaces apart and preventing metal to metal contact therebetween.

9. A machine tool or the like including a fixed support and a second support guided thereon for vertical movement with respect thereto, power means for elevating one support with respect to the other including telescoping screw and nut members, means for minimizing the power requirements for elevation of the movable support comprising undulations establishing high and low points on the mating surfaces of the screw and nut members which support the load, means for maintaining a continuous supply of lubricant to the recesses thus provided between the mating surfaces whereby on relative rotation of the parts a pressure oil film will be built up wedging the surfaces apart and preventing metal to metal contact therebetween, said oil supplying means including a reservoir circumscribing the point where the screw emerges from the top of the nut, a reservoir and a pump mechanism actuated by the power shifting means for the support for conveying lubricant from the main reservoir to said circumscribing reservoir during power operation of the parts to insure adequate maintenance of the pressure oil film.

10. An elevating mechanism for the knee of a milling machine or like machine tool including an elongated nut member and a screw inter-engaged with said nut, means for effecting relative rotation of the parts for performance of the elevating action, the pressure receiving mating faces of said screw and nut members being formed with a multiplicity of non-parallel portions providing lubricant entraining recesses therebetween whereby on relative rotation of the parts in effecting the elevating operation a pressure will be created in the entrained oil tending to lift and maintain the mating surfaces out of metal to metal contact one with the other.

11. An elevating mechanism for the knee of a milling machine or like machine tool including an elongated nut member and a screw inter-engaged with said nut, means for effecting relative rotation of the parts for performance of the elevating action, the pressure receiving mating faces of said screw and nut members being formed with a plurality of non-parallel portions per pitch of the thread and for each of said threads whereby a plurality of lubricant receiving recesses will be provided circumferentially of the screw for each pitch of the thread, and a multiplicity of such recesses throughout the mating portions of the thread and nut effective to create an internal oil pressure forcing the parts out of metal to metal engagement on relative rotation for elevation, the multiple number per pitch effecting a balanced condition preventing lateral binding of the parts.

ALBERT H. DALL.
BERNARD SASSEN.